United States Patent
Yin et al.

(10) Patent No.: US 7,839,756 B2
(45) Date of Patent: Nov. 23, 2010

(54) METHOD AND SYSTEM FOR CONTROLLING OPTICAL PICK-UP HEAD LOCKED TO TRACK CENTER OF OPTICAL STORAGE MEDIUM

(75) Inventors: Hao-Hui Yin, Hsinchu (TW); Chih-Chung Wu, Pingtung County (TW); Kuo-Jung Lan, Taipei County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 383 days.

(21) Appl. No.: 12/171,303

(22) Filed: Jul. 11, 2008

(65) Prior Publication Data
US 2010/0008199 A1     Jan. 14, 2010

(51) Int. Cl.
*G11B 7/00* (2006.01)

(52) U.S. Cl. ............ 369/275.3; 369/59.12; 369/124.15; 369/53.2

(58) Field of Classification Search ............... None
See application file for complete search history.

(56) References Cited

U.S. PATENT DOCUMENTS

| | | | | |
|---|---|---|---|---|
| 6,456,585 | B1 * | 9/2002 | Takemura et al. | 369/275.3 |
| 6,493,306 | B2 * | 12/2002 | Nakane et al. | 369/59.18 |

* cited by examiner

*Primary Examiner*—Muhammad N Edun
(74) *Attorney, Agent, or Firm*—Winston Hsu; Scott Margo

(57) ABSTRACT

A method for controlling a position of a laser spot of a laser beam on an optical storage medium of a land and groove recording/reproduction type is provided. The method includes: detecting a pulse occurring in a reference signal while the laser spot is passing through a boundary between a groove track and a land track, wherein the reference signal is generated according to a reflected laser beam from the optical storage medium; determining a compensation value of the reference signal according to the pulse; utilizing the compensation value to adjust the reference signal for generating an adjusted reference signal; and utilizing the adjusted reference signal to control the position of the laser spot.

9 Claims, 4 Drawing Sheets

METHOD AND SYSTEM FOR CONTROLLING OPTICAL PICK-UP HEAD LOCKED TO TRACK CENTER OF OPTICAL STORAGE MEDIUM

BACKGROUND

The invention relates to a method and system for controlling a position of a laser spot of a laser beam irradiated by an optical pick-up head onto an optical storage medium, and more particularly, to a method and system for controlling a position of a laser spot of a laser beam irradiated by an optical pick-up head to be locked to a track center of an optical storage medium of a land and groove recording/reproduction type, such as a DVD-RAM disc.

Regarding a digital versatile disc (DVD) such as a DVD-Recordable (DVD-R) disc or a DVD-Rewritable (DVD+RW/DVD-RW) disc, accurately controlling a track offset of an optical pick-up head of a DVD drive during recoding data onto the optical disc is not of primary importance to the recording quality, that is because no obvious problem will occur even if the laser light spot emitted from the optical pick-up head is not locked to the center of a groove track (i.e. a data track) of the DVD-R/DVD+RW/DVD-RW disc.

However, regarding a DVD-RAM disc using groove tracks and land tracks for data storage, if the laser light spot emitted from the optical pick-up head is not locked to the center of a second track (e.g. the groove track) of the DVD-RAM disc while the DVD drive is recording data on the second track, data previously written on a first track (e.g. the land track) adjacent to the second track will probably be erased or overwritten, typically causing a large jitter value that represents poor recording quality. In the worst case, at least a portion of the data on the DVD-RAM disc becomes unreadable.

SUMMARY

It is therefore one of the primary objectives of the present invention to provide a method and a system for controlling a position of a laser spot of a laser beam irradiated by an optical pick-up head to be locked to a track center of an optical storage medium of a land and groove recording/reproduction type such as a DVD-RAM disc, to solve the above problem.

According to an embodiment of the present invention, a method for controlling a position of a laser spot of a laser beam on an optical storage medium of a land and groove recording/reproduction type, the method comprising: detecting a pulse occurring in a reference signal while the laser spot is passing through a boundary between a groove track and a land track, wherein the reference signal is generated according to a reflected laser beam from the optical storage medium; determining a compensation value of the reference signal according to the pulse; utilizing the compensation value to adjust the reference signal for generating an adjusted reference signal; and utilizing the adjusted reference signal to control the position of the laser spot.

According to an embodiment of the present invention, a system for controlling a position of a laser spot of a laser beam irradiated by an optical pick-up head onto an optical storage medium of a land and groove recording/reproduction type is disclosed. The system comprises a signal detection unit and a control unit. The signal detection unit is utilized for detecting a pulse occurring in a reference signal while the laser spot is passing through a boundary between a groove track and a land track, wherein the reference signal is generated according to a reflected laser beam from the optical storage medium. The control unit, coupled to the signal detection unit, is utilized for determining a compensation value of the reference signal according to the pulse, and utilizing the compensation value to adjust the reference signal for generating an adjusted reference signal, and utilizing the adjusted reference signal to control the position of the laser spot.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "include", "including", "comprise", and "comprising" are used in an open-ended fashion, and thus should be interpreted to mean "including, but not limited to . . ." The terms "couple" and "coupled" are intended to mean either an indirect or a direct electrical connection. Thus, if a first device couples to a second device, that connection may be through a direct electrical connection, or through an indirect electrical connection via other devices and connections.

In general, the characteristics of the optical disc drive and the loaded optical disc are not ideal. For example, the circuitry of the optical disc drive has an inherent offset and the reflection characteristic of the recording layer on the optical disc is not uniform, affecting the tracking error estimated during the tracking servo control. Therefore, it is difficult for the conventional optical disc to know if the laser spot of the laser beam emitted from the optical pick-up head is at the track center according to the signal level of the tracking error signal. However, due to the fact that the DVD-RAM disc uses groove tracks and land tracks alternately for data storage, the present invention provides a novel scheme of locking the laser spot of the laser beam emitted from the optical pick-up head to the track center of a groove track/land track on a DVD-RAM disc. Further details are given as below.

Figure 1A:
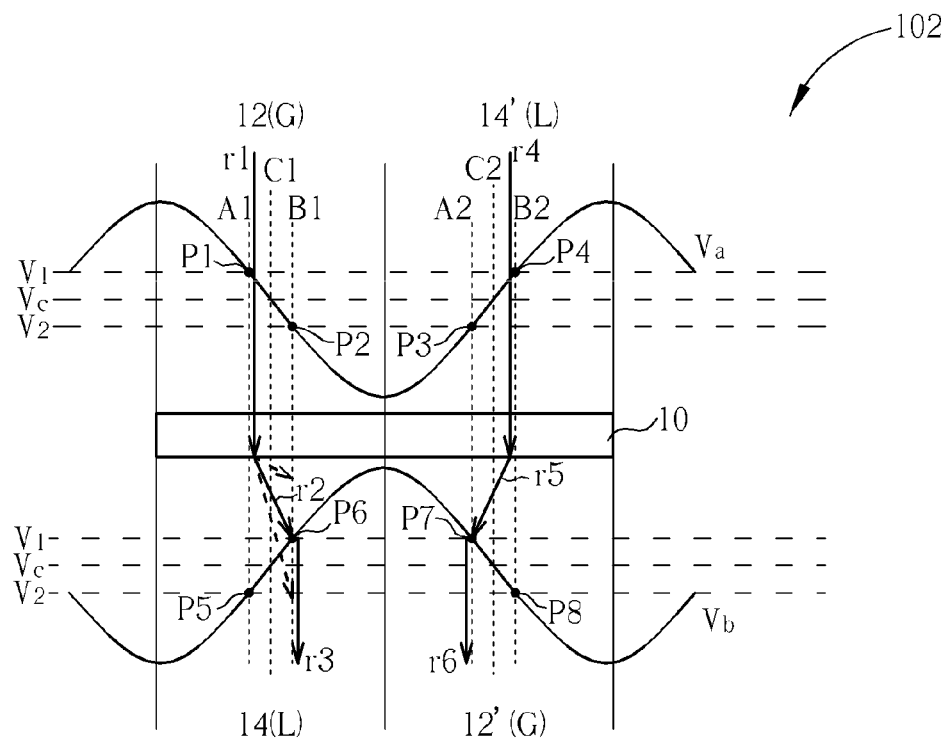
FIG. 1A shows track offset variations of tracking error signals.

Please refer to FIG. 1A. FIG. 1A shows the relationships between laser spot positions and voltage variations of tracking error signals, wherein the tracking error signals can be taken as reference signals here. Presuming center of a DVD-RAM disc 102 is on the left hand side and the DVD-RAM disc 102 rotates counterclockwisely, then it means the laser spot moves downward on the DVD-RAM disc 102.

When the laser spot is located at a position above the header 10 (i.e. before the laser spot crosses the header 10), the voltage variance of the tracking error signal is represented by a voltage variation curve Va. For example, a point P1 and a point P2 in the groove track 12 correspond to a voltage V1 and a voltage V2, respectively. A point P3 and a point P4 in the land track 14' correspond to the voltage V2 and the voltage V1, respectively.

When the laser spot is located at a position below the header 10 (i.e. after the laser spot crosses the header 10), the voltage variance of the tracking error signal is represented by a voltage variation curve Vb. For example, a point P5 and a point P6 in the land track 14 correspond to the voltage V2 and the voltage V1, respectively. A point P7 and a point P8 in the groove track 12' correspond to the voltage V1 and the voltage V2, respectively.

If the laser spot currently moves downward along a track position A1 which is at left hand side of a track center $C_1$ in the groove track 12 above the header 10 (i.e. the laser spot moves along a track line r1 passing through a point P1 before adjusted), the voltage variance of the tracking error signal at this time is represented by the voltage variation curve Va. Thus, the voltage variance of the tracking error signal is the voltage V1 corresponded to the point P1.

When the laser spot moves across the header 10 and reaches the land track 14, the voltage variance of the tracking error signal at this time is represented by the voltage variation curve Vb. However, laser spot still moves downward along the track position A1 due to the inertia, and the voltage variance of the tracking error signal is the voltage V2 corresponded to the point P5 on the voltage variation curve Vb and the track position A1.

In order to maintain the voltage VI of the tracking error signal after crossing the header 10, the laser spot will move along a track line r2 to the track position B1 which is at right hand side of the track center $C_1$ in the land track 14. Please note that the moving direction of the laser spot is controllable (i.e. the slope of the track line r2 can be changed as the two dotted lines shown in FIG. 1A). After the tracking error signal returns to the voltage V1 of a point P6, the laser spot moves downward along the track position B1 (i.e. the laser spot moves along the track line r3).

Thus, when the laser spot moves from the groove track 12 to the land track 14, the moving direction of the laser spot changes from the track position A1 (i.e. the track line r1) to the track line r2 temporarily and then to the track position B1 (i.e. the track line r3). The tracking error signal changes from the voltage V1 to the voltage V2 shortly (at the time when the laser spot crossing the header 10) and then returns to the voltage V1.

Afterward, the laser spot continues to move downward along the track position B1. After the DVD-RAM disc 102 undergoes a full rotation, the moving direction of the laser spot becomes the track position B2 of the next land track 14' (i.e. the laser spot moves to the outer circle in a spiral way, and then the laser spot moves along the track line r4 passing through a point P4), and the tracking error signal remains at the voltage V1.

Similarly, when the laser spot moves from the land track 14' to the groove track 12', the moving direction of the laser spot changes from the track position B2 (i.e. the track line r4) to the track line r5 temporarily and then to the track position A2 (i.e. the track line r6). The tracking error signal changes from the voltage V1 to the voltage V2 shortly (at the time when the laser spot crossing the header 10) and then returns to the voltage V1.

Figure 1B:
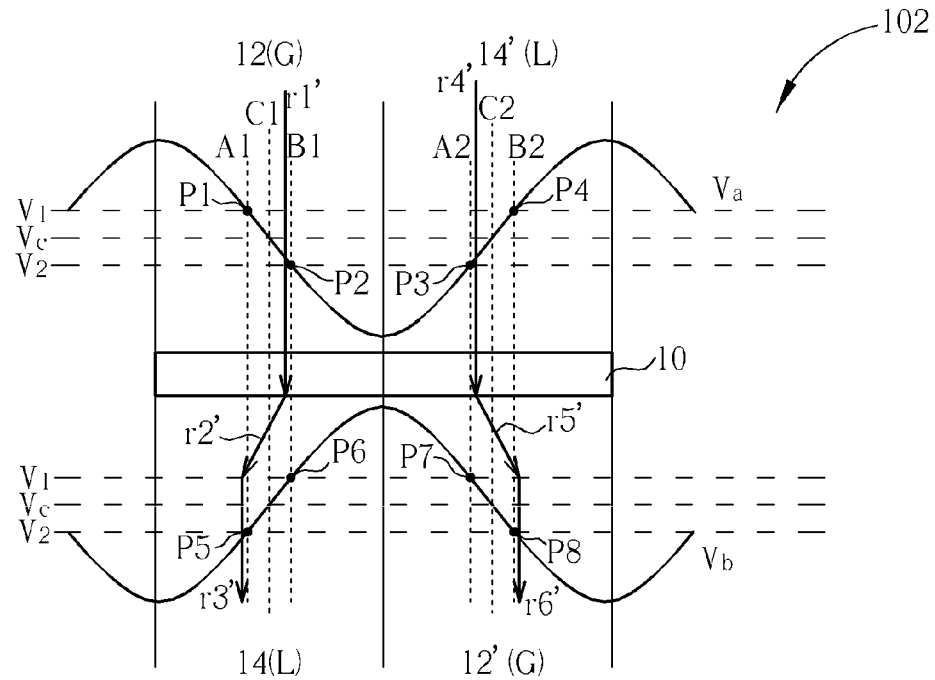
FIG. 1B shows track offset variations of tracking error signals.

Furthermore, as shown in FIG. 1B, if the laser spot currently moves downward along a track position B1 which is at right hand side of a track center $C_1$ in the groove track 12 above the header 10 (i.e. the laser spot moves along a track line r1' passing through a point P2 before adjusted), then the tracking variation of the laser spot is r1'→r2'→r3'→r4'→r5'→r6'. Thus the tracking error signal changes from the voltage V2 to the voltage V1 shortly (at the time when the laser spot crossing the header 10) and then returns to the voltage V2. Due to the related operation details are all well illustrated in the above paragraphs, and thus further explanation of the operation details are omitted herein for the sake of brevity.

It is noted that the term "track position" is referred to throughout the disclosure as a position of the laser spot, more precisely the center position of the laser spot, irradiated on a groove track or land track when the optical pick-up head is moving along the groove track or land track.

Figure 2:
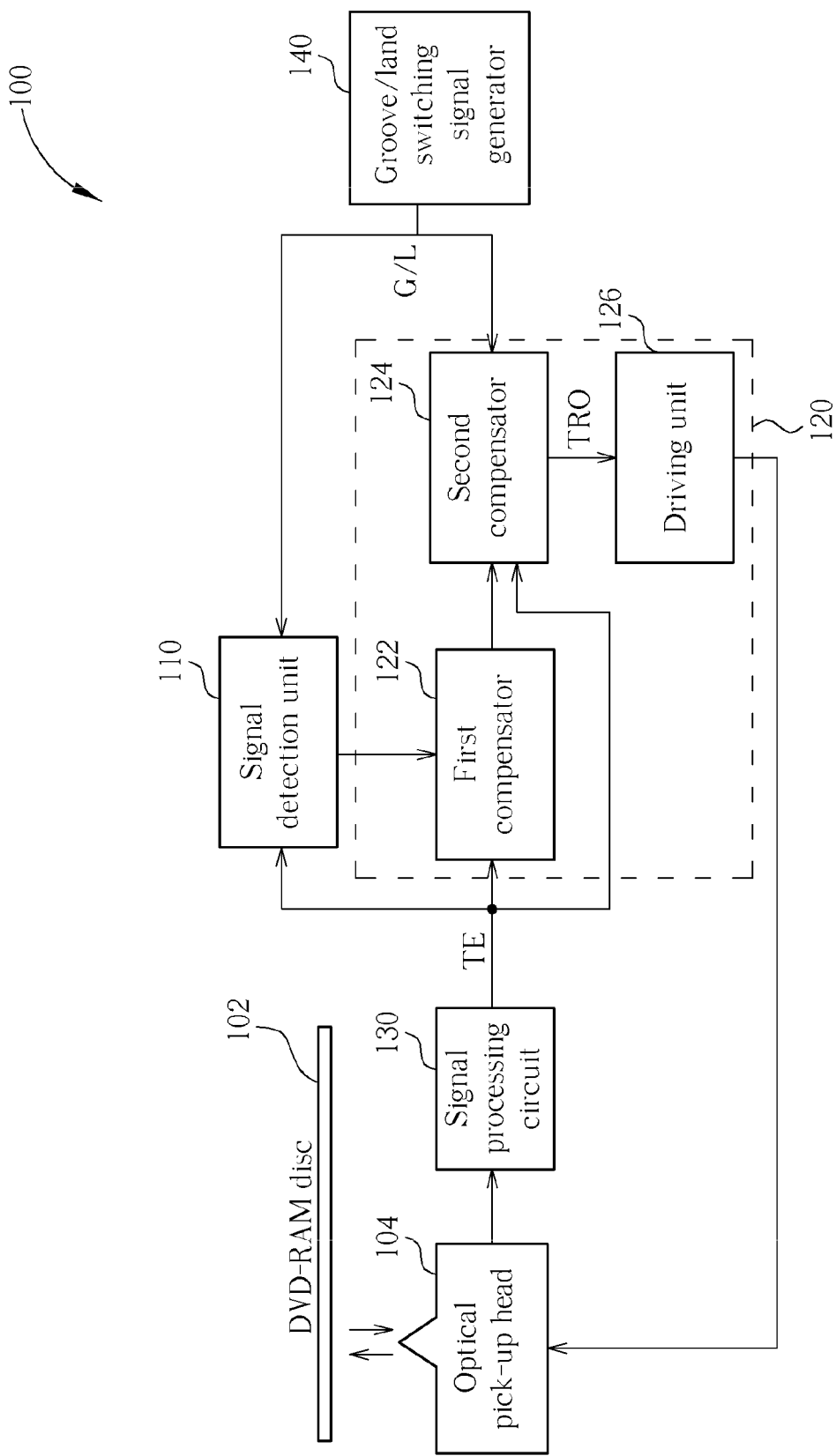
FIG. 2 shows a system for controlling a position of a laser spot according to an embodiment of the present invention.

These aforementioned characteristics of the tracking error signal will be utilized in the present invention to estimate the deviation from the track center and calibrate the position of the laser spot on the optical disc. Please refer to FIG. 2. FIG. 2 shows a system 100 for controlling a position of a laser spot of a laser beam irradiated by an optical pick-up head 104 to be locked to a track center of an optical storage medium of a land and groove recording/reproduction type according to an embodiment of the present invention. As shown in FIG. 2, in addition to the optical pick-up head 104, the system 100 includes a signal detection unit 110, a control unit 120, a signal processing circuit 130, and a groove/land switching signal generator 140.

In this embodiment, the control unit 120 includes a first compensator 122, a second compensator 124, and a driving unit 126, and the optical storage medium of a land and groove recording/reproduction type can be a DVD-RAM disc 102. As known to those skilled in this art, the optical pick-up head 104 has a tracking actuator (not shown) implemented therein. Therefore, the tracking actuator will move the laser spot in a radial direction of the DVD-RAM disc 102 in response to the control signal generated from the driving unit 126 (e.g. a driver of the tracking actuator). Please note that these are for illustrative purposes only, and are not meant to be limitations of the present invention. Additionally, only the components pertinent to the present invention are shown in FIG. 2 for simplicity.

The method for controlling the position of the laser spot to be locked to the track center of a groove track/land track on the DVD-RAM disc 102 utilizes the signal detection unit 110 to detect the pulse occurring in a tracking error signal TE while the laser spot is passing through the header 10 between the groove track 12 and the land track 14 shown in FIG. 1A and FIG. 1B (i.e. while the laser spot is passing through the boundary between the groove track 12 and the land track 14), wherein the tracking error signal TE is generated according to a reflected laser beam from the DVD-RAM disc 102 through the signal processing unit 130. Since the generation of the tracking error signal is well known to those skilled in this art, further description is omitted here for brevity.

Figure 3:
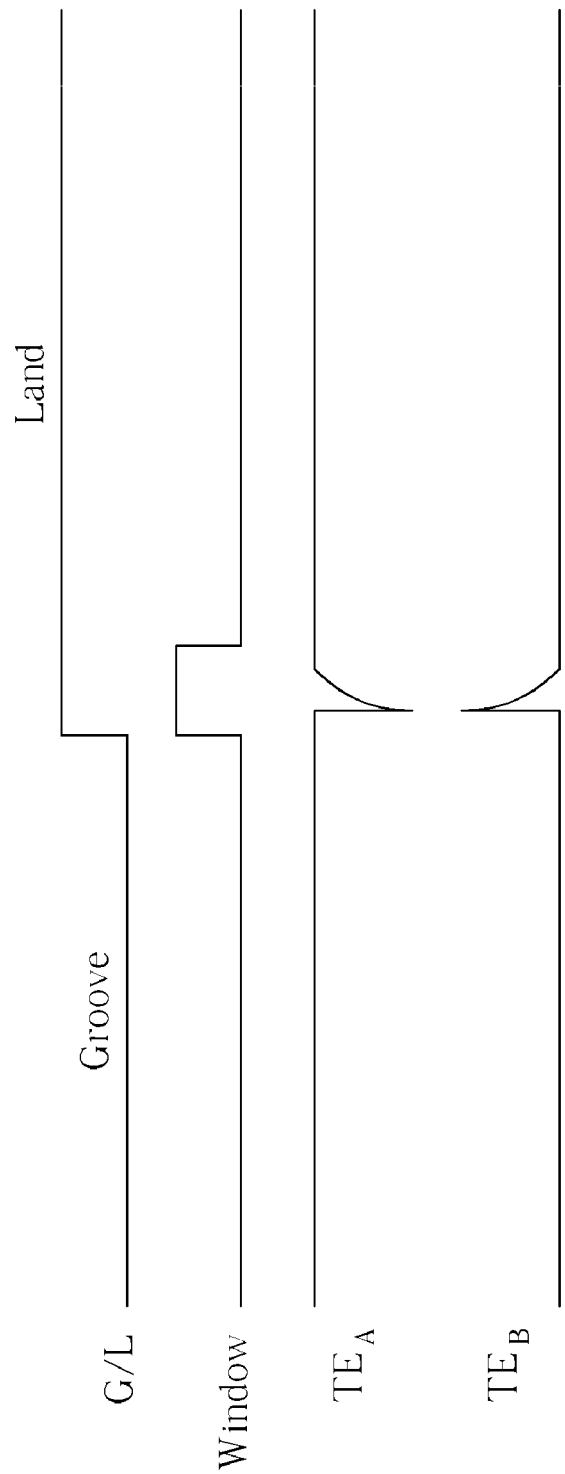
FIG. 3 shows a groove/land switching signal, a detection window, and tracking error signals.

In this embodiment, the groove/land switching signal generator 140 is implemented to detect the transition between the groove track and the land track per revolution of the DVD-RAM disc 102, and output a groove/land switching signal G/L to indicate the transition. As shown in FIG. 3, when the optical pick-up head 104 encounters a transition from a groove track to a land track, the groove/land switching signal G/L has a transition from a low logic level to a high logic level, indicating the groove/land switching. It should be noted that any known mechanisms can be employed by the groove/land switching signal generator 140 to detect the transition between the groove track and the land track.

Additionally, according to above-mentioned characteristics of the tracking error signal, a pulse will occur with a bottom voltage level in the tracking error signal around the boundary between the groove track and the land track when the laser spot located at a track position left of the track center is passing through the header from the groove track to the land track, or when the laser spot located at a track position right of the track center is passing through the header from the land track to the groove track.

In addition, a pulse will occur with a peak voltage level in the tracking error signal around the boundary between the groove track and the land track when the laser spot located at a track position right of the track center is passing through the header from the groove track to the land track, or when the laser spot located at a track position left of the track center is passing through the header from the land track to the groove track.

Referring to FIG. 3 in conjunction with FIG. 1A and FIG. 1B. When the laser spot located at track position A1 moves from point P1 in the groove track to point P5 in the land track of FIG. 1A, the tracking error signal (indicated by $TE_A$ in FIG. 3) shortly has a bottom voltage level (V2) at the timing when the transition from the groove track to the land track occurs. Similarly, when the laser spot located at track position B1 moves from point P2 in the groove track to point P6 in the land track, the tracking error signal (indicated by $TE_B$ in FIG. 3) shortly has a peak voltage level (V1) at the timing when the transition from the groove track to the land track occurs.

Additionally, referring to FIG. 3 in conjunction with FIG. 1A and FIG. 1B, in this embodiment of the present invention, the signal detection unit 110 enables a detection window for monitoring an extreme value of the pulse such as a peak voltage level or a bottom voltage level of the pulse when notified by the groove/land switching signal G/L (as shown in FIG. 3). Next, the present invention method utilizes the first compensator 122 to determine a compensation value of the tracking error signal TE according to the measured extreme value of the pulse.

For example, if a peak voltage level of the tracking error signal $TE_B$ shown in FIG. 3 is detected by the signal detection unit 110, then the laser spot is identified to be locked to a track position which is at right hand side of the track center in the groove track (i.e. the voltage value of the tracking error signal of the laser spot is lower than the voltage value of the track center), and if a bottom voltage value of the tracking error signal $TE_A$ is detected by the signal detection unit 110, then the laser spot is identified to be locked to a track position which is at left hand side of the track center in the groove track (i.e. the voltage value of the tracking error signal of the laser spot is higher than the voltage value of the track center). Therefore, the first compensator 122 can determine the appropriate compensation value of the tracking error signal according to the measured extreme value of the pulse based on the aforementioned characteristics of the tracking error signal.

Next, the present invention method utilizes the second compensator 124 for utilizing the compensation value given by the first compensator 122 in order to adjust the tracking error signal TE to generate a tracking driving signal TRO corresponding to an adjusted tracking error signal. In this exemplary embodiment, the second compensator 124 can be configured to have an adder and a compensating circuit. The adder is implemented to add the compensation value to the tracking error signal TE for providing the adjusted tracking error signal, and the compensating circuit then processes the adjusted tracking error signal to generate the tracking driving signal TRO. However, this is not meant to be a limitation of the present invention, and other circuit architectures are possible. Then, the present invention method utilizes the driving unit 126 to convert the tracking driving signal TRO into a desired control signal in order to control the optical pick-up head 104 to adjust the position of the laser spot on the DVD-RAM disc 102.

In this embodiment, the first compensator 122 and the second compensator 124 are implemented as individual circuits. However, in another embodiment of the present invention, the first compensator 122 and the second compensator 124 can be implemented by a single digital signal processor (DSP) to adjust the tracking error signal TE for achieving the objective of compensating the tracking error signal TE for the inherent errors induced by the internal circuitry of the optical disc drive and/or the optical disc. This alternative design also obeys the spirit of the present invention.

In addition, after measuring an extreme value of the pulse, the present invention method is able to determine an average value of an initial value of the tracking error signal and the extreme value of the pulse, wherein the tracking error signal has the initial voltage level while the laser spot is passing through the header between the groove track and the land track, and the average value of an initial value of the tracking error signal and the extreme value of the pulse is the voltage value of the track center. For example, referring to FIG. 1A, if the laser spot is moving from point P1 to point P5, the above initial value and extreme value are voltage levels V1 and V2 respectively. By averaging the voltage levels V1 and V2, the voltage level $V_c$ corresponding to the track center of the groove track 12 or land track 14 can be estimated. Therefore, the present invention method can determine the compensation value according to the average value (i.e. the voltage level $V_c$). In other words, after the laser spot position calibration is complete, the magnitude of the tracking error signal TE is locked to the voltage level $V_c$ through the tracking servo control. At this time, the laser spot can be properly locked to the track center of the groove track 12 or land track 14. In this way, the data recording quality is greatly improved.

Figure 4:
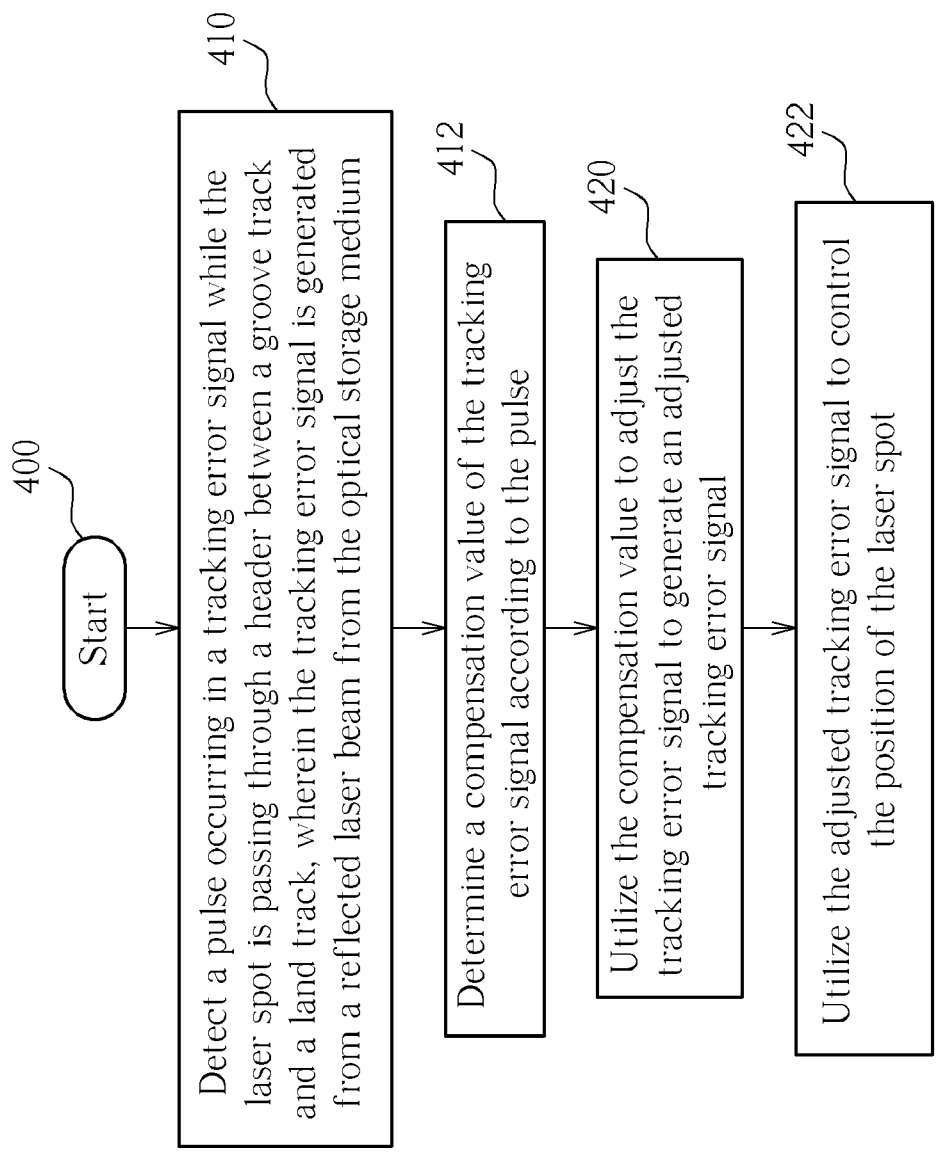
FIG. 4 is a process flow chart showing a method for controlling the position of the laser spot according to an embodiment of the present invention.

To summarize the present invention method concisely, please refer to FIG. 4. FIG. 4 is a process flow chart showing the method for controlling the position of the laser spot to be locked to the track center of the optical storage medium of the land and groove recording/reproduction type according to an embodiment of the present invention. Provided that substantially the same result is achieved, the steps of the process flow chart need not be in the exact order shown and need not be contiguous, that is, other steps can be intermediate. The present invention method comprises:

Step 400: Start.
Step 410: Detect a pulse occurring in a tracking error signal while the laser spot is passing through a header between a groove track and a land track, wherein the tracking error signal is generated according to a reflected laser beam from the optical storage medium.
Step 412: Determine a compensation value of the tracking error signal according to the pulse.
Step 420: Utilize the compensation value to adjust the tracking error signal to generate an adjusted tracking error signal.
Step 422: Utilize the adjusted tracking error signal to adjust the position of the laser spot.

Briefly summarized, the present invention offers an efficient and economical solution for controlling (calibrating) the position of the laser spot of a laser beam irradiated by an optical pick-up head to be locked to the track center of an optical storage medium of a land and groove recording/reproduction type such as a DVD-RAM disc.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling a position of a laser spot of a laser beam on an optical storage medium of a land and groove recording/reproduction type, the method comprising:
   detecting a pulse occurring in a reference signal while the laser spot is passing through a boundary between a groove track and a land track, wherein the reference signal is generated according to a reflected laser beam from the optical storage medium;
   determining a compensation value of the reference signal according to the pulse;
   utilizing the compensation value to adjust the reference signal for generating an adjusted reference signal; and
   utilizing the adjusted reference signal to control the position of the laser spot.

2. The method of claim 1, wherein the reference signal is a tracking error signal.

3. The method of claim 1, wherein determining the compensation value of the reference signal according to the pulse comprises:
   measuring an extreme value of the pulse to determine the compensation value.

4. The method of claim 1, wherein determining the compensation value of the reference signal according to the pulse comprises:
   measuring an extreme value of the pulse; and
   determining an average value of an initial value of the tracking error signal and the extreme value of the pulse, wherein the tracking error signal has an initial voltage level while the laser spot is passing through the boundary between a groove track and a land track; and
   determining the compensation value according to the average value.

5. The method of claim 1, wherein the optical storage medium is a DVD-RAM disc, and the boundary is a header between the groove track and the land track.

6. A system for controlling a position of a laser spot of a laser beam on an optical storage medium of a land and groove recording/reproduction type, the system comprising:
   a signal detection unit detecting a pulse occurring in a reference signal while the laser spot is passing through a boundary between a groove track and a land track, wherein the reference signal is generated according to a reflected laser beam from the optical storage medium; and
   a control unit determining a compensation value of the reference signal according to the pulse, utilizing the compensation value to adjust the reference signal for generating an adjusted reference signal, and utilizing the adjusted reference signal to control the position of the laser spot.

7. The system of claim 6, wherein the signal detection unit is a tracking error signal detection unit.

8. The system of claim 6, wherein the control unit comprises:
   a first compensator, coupled to the signal detection unit, for determining a compensation value of the reference signal according to the pulse;
   a second compensator, coupled to the first compensator, for utilizing the compensation value to adjust the reference signal to generate an adjusted reference signal; and
   a driving unit, coupled to the second compensator, for controlling the optical pick-up head to adjust the position of the laser spot on the optical storage medium according to an output of the second compensator corresponding to the adjusted reference signal.

9. The system of claim 6, wherein the optical storage medium is a DVD-RAM disc, and the boundary is a header between the groove track and the land track.

* * * * *